United States Patent [19]

Kerr

[11] 4,341,294
[45] Jul. 27, 1982

[54] SPIRAL TYPE ONE-WAY CLUTCH ASSEMBLY

[76] Inventor: John H. Kerr, P.O. Box 40, Treasure Island, R.R. #1, Kingston, Ontario, Canada, K7L 4V1

[21] Appl. No.: 123,064

[22] Filed: Feb. 20, 1980

Related U.S. Application Data

[63] Continuation-in-part of Ser. No. 39,299, May 15, 1979, abandoned.

[30] Foreign Application Priority Data

Feb. 20, 1979 [CA] Canada .................................. 321941

[51] Int. Cl.³ ........................ F16D 15/00; F16D 41/06
[52] U.S. Cl. ........................................ 192/45; 192/72; 192/77; 192/80
[58] Field of Search .................... 192/45, 41 R, 44, 72, 192/77, 78, 80, 48.92; 188/82.1, 82.84, 82.8

[56] References Cited

U.S. PATENT DOCUMENTS

| | | |
|---|---|---|
| 184,273 | 11/1876 | Wakefield . |
| 300,503 | 6/1884 | Rascoe . |
| 524,652 | 8/1894 | Risinger . |
| 1,618,915 | 2/1927 | Constantinesco ................. 192/41 R |
| 1,812,227 | 6/1931 | Walker ................................ 403/358 |
| 1,834,843 | 12/1931 | Humfrey . |
| 1,855,690 | 4/1932 | Robbins . |
| 1,893,231 | 1/1933 | Floyd . |
| 1,931,317 | 10/1933 | Fishburn . |
| 1,946,043 | 2/1934 | Tuck . |
| 2,785,782 | 3/1957 | Dodge . |
| 3,021,925 | 2/1962 | Osborne . |
| 3,107,764 | 10/1963 | Fulton .............................. 192/41 R |
| 3,202,250 | 8/1965 | Fulton . |
| 3,368,834 | 2/1968 | Stratienko . |
| 3,595,354 | 7/1971 | Charpentier ................... 188/82.8 X |
| 3,746,136 | 7/1973 | Marola et al. .......................... 192/45 |
| 3,937,311 | 2/1976 | Gehrke . |

FOREIGN PATENT DOCUMENTS

| | | |
|---|---|---|
| 544146 | 7/1957 | Canada . |
| 965360 | 4/1975 | Canada . |
| 915402 | 7/1954 | Fed. Rep. of Germany ........ 192/45 |
| 891794 | 3/1944 | France . |
| 1005049 | 4/1952 | France . |
| 1052962 | 1/1954 | France ................................... 192/45 |
| 1249988 | 11/1960 | France ............................ 188/82.84 |
| 171801 | 12/1934 | Switzerland .......................... 192/48 |

Primary Examiner—Rodney H. Bonck
Attorney, Agent, or Firm—Birch, Stewart, Kolasch & Birch

[57] ABSTRACT

A spiral type one way clutching assembly and mechanism is provided herein which is insensitive to transverse forces; substantially eliminates overrunning frictional wear on the critically shaped surfaces of its members; and substantially eliminates the role of chance in establishing the clutching load distribution between its members. The clutching mode may be active or passive. The clutching mechanism utilizes monolithic annular outer and concentrically positioned annular inner body members which have mutually opposed tangentially congruent spiral surfaces defining a spiral race therebetween. The spiral race is provided with inner and outer abutments. At least one of the inner and the outer body members have a radially directed slit extending therethrough. The outer body member and the inner body member are relatively rotatably oscillatable with respect to each other. A plurality of axially oriented abutting roller members is positioned in, an almost fills, the spiral race, each such member being in contact with the inner and the outer spiral surfaces. Limit springs act between the body members for limiting the relative oscillatory movement therebetween.

24 Claims, 9 Drawing Figures

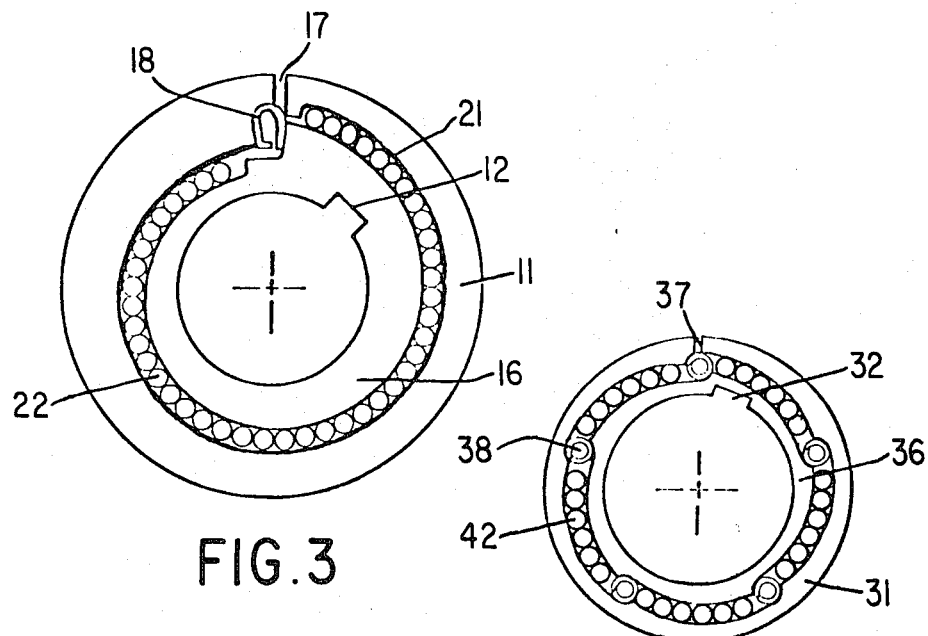
FIG. 3
FIG. 4
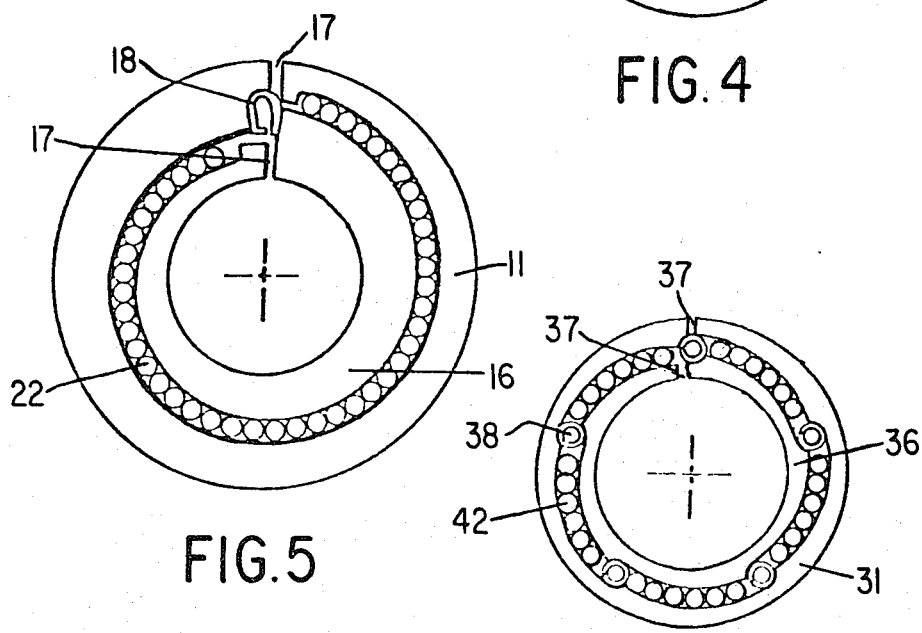
FIG. 5
FIG. 6

SPIRAL TYPE ONE-WAY CLUTCH ASSEMBLY

This application is a C-I-P of Application Ser. No. 39,299 filed May 15, 1979, now abandoned.

BACKGROUND OF THE INVENTION (i) Field of the Invention

The present invention relates to clutches in general and in particular to a novel spiral type one-way clutch mechanism. It also relates to novel overrunning spiral type one-way clutches of the roller ramp type.

(ii) Description of the Prior Art

One-way clutches presently in existence include sprag, friction wedge, and roller ramp type, which generally consist of a plurality of individually activated jamming elements that are radially located between the concentric, clutching members.

Risinger, in U.S. Pat. No. 524,652 patented Aug. 14, 1899, provided a bicycle including an intermittent grip mechanism including three distinct crescent shaped wedges disposed concentric to, but outboard of a ratchet portion, with a series of rollers interposed between the opposing edges of the wedges and the ratchet faces to facilitate movement of the wedges.

Constantinesco, in U.S. Pat. No. 1,618,915 patented Feb. 22, 1927, provided a unidirectional driving device including an annular rotor; a concentrically disposed series of separate wedge-shaped crescent members; and elastic roller bearings disposed in the space between the rotor and the wedge-shaped members.

Dodge, in U.S. Pat. No. 2,785,782 patented Mar. 19, 1957, provided a wedge type one-way clutch including an annular outer race, an inner race and a plurality of outer wedge/inner wedge crescent elements disposed therebetween, with each outer wedge/inner wedge crescent element including a plurality of cylindrical rollers therebetween.

Fulton, in U.S. Pat. No. 3,202,250 patented Aug. 21, 1965, provided an annular outer race, a cylindrical inner race, and a spiral wedge acting as a gripping member, with a surface coating of low friction material between the spiral wedge and the outer race.

Ollagnon et al. in French Pat. No. 891,793 patented Mar. 20, 1944 disclosed a one-way clutching mechanism including an annular outer race composed of a plurality of wedge-shaped crescent elements, an inner race composed of a plurality of wedge-shaped crescent elements, with rollers disposed between the outer race and the inner race.

Other patents which disclose one-way clutching mechanisms include:

U.S. Pat. Nos. 184,273, 300,503, 1,834,843, 1,855,690, 1,893,231, 1,931,317, 1,946,043, 3,021,925, 3,107,764, 3,937,311, 3,368,834, 3,595,354, 3,326,345.

French Pat. No. 1,005,049.

Canadian Pat. Nos. 544,146, 965,360.

The clutching mechanisms disclosed in the above-discussed prior art patents have some or all of the following operating characteristics: (a) uniform distribution of the clutching load depends on identical kinematic response of the jamming-elements; (b) transverse forces, such as those caused by a simultaneous rotation of the geometric axis of the clutch assembly around a second axis, increase the disarray in the response of the jamming-elements; and (c) the critically shaped surfaces of the jamming-elements can be subject to frictional wear when in the overrunning mode.

SUMMARY OF THE INVENTION (i) Aims of the Invention

The present invention has for its main objects the provision of a clutching mechanism that (a) substantially eliminates the role of chance in establishing the clutching load distribution between its members, (b) makes it substantially insensitive to transverse forces, (c) substantially eliminates overrunning frictional wear on the critically shaped surfaces of its members, and (d) provides a means whereby the clutching mode can be selected to be either active or passive.

(ii) Statements of Invention

This invention generally provides a spiral type one-way clutching mechanism comprising: (a) a monolithic, annular outer body member including an inner spiral surface having at least one spiral segment defining an axially oriented opening through the outer body member; (b) a concentrically mounted, monolithic inner body member positioned in the axially oriented opening, including an outer spiral surface having at least one spiral segment which is tangentially congruent to the inner spiral surface of the outer body member, the congruent inner and outer spiral surfaces defining a spiral race therebetween, one end of the spiral race defined in part by the outer spiral surface having an inner abutment provided by a radially outwardly extending protrusion or flange on the inner body member, the other end of the spiral race defined in part by the inner spiral surface having an outer abutment provided by a radially inwardly directed protrusion on the outer body member, at least one of the body members having a radially directed slit extending therethrough; the outer body member (a) and the inner body member (b) being relatively rotatably oscillatable with respect to each other; (c) a plurality of axially oriented roller members positioned in the spiral race, substantially but not completely filling the spiral race, the roller members contacting the inner and the outer spiral surfaces and adapted to abut the inner abutment and the outer abutment when free-wheeling; and (d) resilient limit means acting between the body members, for limiting relative oscillatory movement therebetween.

This invention is also embodied in a first specific embodiment by a spiral type one-way clutching mechanism comprising: (a) a monolithic, annular outer body member having a cylindrical outer surface provided with keyway therein and an inner spiral surface having at least one spiral segment defining an axially oriented opening through the outer body member; a concentrically mounted, monolithic, annular inner body member positioned in said axially oriented opening having a cylindrical inner surface and an outer spiral surface having at least one spiral segment which is tangentially congruent to the inner spiral surface of said outer body member, said congruent inner and outer spiral surfaces defining a spiral race therebetween, one end of spiral race defined in part by said outer spiral surface having an inner abutment provided by a radially outwardly extending protrusion or flange on said inner body member, the other end of said spiral race defined in part by said inner spiral surface having an outer abutment provided by a radially inwardly directed protrusion on said outer body member; said outer body member (a) and said inner body member (b) being relatively rotatably oscillatable with respect to each other; a plurality of axially oriented, abutting roller members positioned in said spiral race, substantially but not completely filling said spiral race, said roller members contacting said inner and said outer spiral surfaces and adapted to abut said inner abutment and said outer abutment when free-wheeling; and (c) limit spring means acting between the body members for limiting relative oscillatory movement therebetween.

This invention is also embodied in a second specific embodiment by a spiral type one-way clutching mechanism comprising: (a) a monolithic, annular, outer body member having a cylindrical outer surface, and an inner spiral surface having at least one spiral segment defining an axially oriented opening through the outer body member; (b) a concentrically mounted, monolithic, annular inner body member positioned in the axially oriented opening having a cylindrical inner surface and an outer spiral surface having at least one spiral segment which is tangentially congruent to the inner spiral surface of the outer body member, the congruent inner and outer spiral surfaces defining a spiral race therebetween, one end of the spiral race defined in part by the outer spiral surface having an inner abutment provided by a radially outwardly extending protrusion or flange on the inner body member, the other end of the spiral race defined in part by the inner spiral surface having an outer abutment provided by a radially inwardly directed protrusion on the outer body member, the inner member having a radially directed slit extending therethrough; the outer body member (a) and the inner body member (b) being relatively rotatably oscillatable with respect to each other; (c) a plurality of axially oriented, abutting roller members positioned in the spiral race, substantially but not completely filling the spiral race, the roller members contacting the inner and the outer spiral surfaces and adapted to abut the inner abutment and the outer abutment when free-wheeling; and (d) limit spring means acting between the body members for limiting relative oscillatory movment therebetween.

This invention is also further embodied in a third specific embodiment by a spiral type one-way clutching mechanism comprising: (a) a monolithic, annular outer body member having a cylindrical outer surface and an inner spiral surface having at least one spiral segment defining an axially oriented opening through the outer body member, the outer body member having a radially directed slit extending therethrough; (b) a concentrically mounted, monolithic, annular inner body member positioned in the axially oriented opening, having a cylindrical inner surface provided with a keyway therein, and an outer spiral surface having at least one spiral segment which is tangentially congruent to the inner spiral surface of the outer body member, the congruent inner and outer spiral surfaces defining a spiral race therebetween, one end of the spiral race defined in part by the outer spiral surface having an inner abutment provided by a radially outwardly extending protrusion or flange on the inner body member, the other end of the spiral race defined in part by the inner spiral surface having an outer abutment provided by a radially inwardly directed protrusion on the outer body member; the outer body member (a) and the inner body member (b) being relatively rotatably oscillatable with respect to each other; (c) a plurality of axially oriented, abutting roller members positioned in the spiral race, substantially but not completely filling the spiral race, the roller members contacting the inner and the outer spiral surfaces and adapted to abut the inner abutment and the outer abutment when free-wheeling; and (d) limit spring means acting between the body members for limiting relative oscillatory movement therebetween.

This invention is still further embodied in another specific embodiment by a spiral type one-way clutching mechanism comprising: (a) a monolithic, annular, outer body member having a cylindrical outer surface and an inner spiral surface having at least one spiral segment defining an axially oriented opening through the outer body member, the outer member having a radially directed slit extending therethrough; (b) a concentrically mounted, monolithic, annular inner body member positioned in the axially oriented opening, having a cylindrical inner surface, and an outer spiral surface having at least one spiral segment which is tangentially congruent to the inner spiral surface of the outer body member, the congruent inner and outer spiral surfaces defining a spiral race therebetween, one end of the spiral race defined in part by the outer spiral surface having an inner abutment provided by a radially outwardly extending protrusion or flange on the inner body member, the other end of the spiral race defined in part by the inner spiral surface having an outer abutment provided by a radially inwardly directed protrusion on the outer body member, at least one of the body members having a radially directed slit extending therethrough; the outer body member (a) and the inner body member (b) being relatively rotatably oscillatable with respect to each other; (c) a plurality of axially oriented roller members positioned in the spiral race, substantially but not completely filling the spiral race, the roller members contacting the inner and the outer spiral surfaces and adapted to abut the inner abutment and the outer abutment when free-wheeling; and (d) limit spring means acting between the body members for limiting relative oscillatory movement therebetween.

The invention is still further embodied, in a fourth specific embodiment, by a spiral type one-way clutching mechanism comprising: (a) a monolithic, annular, outer body member having a cylindrical outer surface provided with a keyway therein and an inner spiral surface having at least one spiral segment defining an axially oriented opening through the outer body member; (b) a concentrically mounted, monolithic, annular inner body member positioned in the axially oriented opening having a cylindrical inner surface and an outer spiral surface having at least one spiral segment which is tangentially congruent to the inner spiral surface of the outer body member, the congruent inner and outer spiral surfaces defining a spiral race therebetween, one end of the spiral race defined in part by the outer spiral surface having an inner abutment provided by a radially outwardly extending protrusion or flange on the inner body member, the other end of the spiral race defined in part by the inner spiral surface having an outer abutment provided by a radially inwardly directed protrusion on the outer body member, the inner member having a radially directed slit extending therethrough, each of the inner and outer surfaces of spiral configuration being constituted by a plurality of circumferentially adjacent spiral segments, each segment extending from a zone of maximum radius to a zone of minimum radius, each zone of minimum radius being connected to an adjacent zone of maximum radius by a radially outwardly curved portion of the inner and outer spiral surfaces respectively; the outer body member (a) and the inner body member (b) being relatively rotatably oscillatable with respect to each other; (c) a plurality of axially oriented, abutting roller members positioned in the spiral race, substantially but not completely filling the spiral race, the roller members contacting the inner and the outer spiral surfaces and adapted to abut the inner abutment and the outer abutment when freewheeling; and (d) resilient limit means acting between the body members for limiting relative oscillatory movement therebetween.

The invention is still further embodied, in a fifth specific embodiment, by a spiral type one-way clutching mechanism comprising: (a) a monolithic, annular, outer body member having a cylindrical outer surface, and an inner spiral surface having at least one spiral segment defining an axially oriented opening through the outer body member, the outer body member having a radially directed slit extending therethrough; (b) a concentrically mounted, monolithic, annular inner body positioned in the axially oriented opening, having a cylindrical inner surface provided with a keyway therein, and an outer spiral surface having at least one spiral segment which is tangentially congruent to the inner spiral surface of the outer body member, the congruent inner and outer spiral surfaces defining a spiral race therebetween, one end of the spiral race defined in part by the outer spiral surface having an inner abutment provided by a radially outwardly extending protrusion or flange on the inner body member, the other end of the spiral race defined in part by the inner spiral surface having an outer abutment provided by a radially inwardly directed protrusion on the outer body member, each of the inner and outer surfaces of spiral configuration being constituted by a plurality of circumferentially adjacent spiral segments, each segment extending from a zone of maximum radius to a zone of minimum radius, each zone of minimum radius being connected to an adjacent zone of maximum radius by a radially outwardly curved portion of the inner and outer spiral surfaces respectively; the outer body member (a) and the inner body member (b) being relatively rotatably oscillatable with respect to each other; (c) a plurality of axially oriented, abutting roller members positioned in the spiral race, substantially but not completely filling the spiral race, the roller members contacting the inner and the outer spiral surfaces and adapted to abut the inner abutment and the outer abutment when freewheeling. and (d) resilient limit means acting between the body members for limiting relative oscillatory movement therebetween.

The invention is still further embodied, in a sixth specific embodiment, by a spiral type one-way clutching mechanism comprising: (a) a monolithic, annular, outer body member having a cylindrical outer surface and an inner spiral surface having at least one spiral segment defining an axially oriented opening through the outer body member, the outer member having a radialy directed slit extending therethrough; (b) a concentrically mounted, monolithic, annular inner body member positioned in the axially oriented opening, having a cylindrical inner surface and an outer spiral surface having at least one spiral segment which is tangentially congruent to the inner spiral surface of the outer body member, the congruent inner and outer spiral surfaces defining a spiral race therebetween, one end of the spiral race defined in part by the outer spiral surface having an inner abutment provided by a radially outwardly extending protrusion or flange on the inner body member, the other end of the spiral race defined in part by the inner spiral surface having an outer abutment provided by a radially inwardly directed protrusion on the outer body member, each of the inner and outer surfaces of spiral configuration being constituted by a plurality of circumferentially adjacent spiral segments, each segment extending from a zone of maximum radius to a zone of minimum radius, each zone of minimum radius being connected to an adjacent zone of maximum radius by a radially outwardly curved portion of the inner and outer spiral surfaces respectively, the inner member having a radially directed slit extending therethrough; the outer body member (a) and the inner body member (b) being relatively rotatably oscillatable with respect to each other; (c) a plurality of axially oriented, abutting roller members positioned in the spiral race, substantially but not completely filling the spiral race, the roller members contacting the inner and the outer spiral surfaces and adapted to abut the inner abutment and the outer abutment when freewheeling; and (d) resilient limit means acting between the body members for limiting relative oscillatory movement therebetween.

These spiral type one-way clutching mechanisms may also be embodied as a spiral type one-way clutch assembly including the clutching mechanism as described in the broad aspect of this invention in combination with: (i) an outer frame; (ii) means cooperating with the outer body member of the clutching mechanism for securing the outer body member of the clutching mechanism to the outer frame; (iii) a frusto-conical inner surface provided on the cylindrical inner surface of the inner body member of the clutching mechanism; and (iv) a concentrically mounted drive shaft having an axially movable frusto-conical member, the axially movable frusto-conical member being disposed within the aperture in the inner body member of the clutching mechanism; the axially movable member being axially movable between a passive position out of engagement with the frusto-conical inner surface of the inner body member of the clutching mechanism, and an active position in engagement with the frusto-conical inner surface of the inner body member of the clutching mechanism.

The spiral type one-way clutching mechanism may also be embodied as a spiral type one-way clutch assembly including the clutching mechanism as described in the first and the fourth specific embodiments, in combination with: (i) an outer frame; (ii) spline means cooperating with the keyway of the outer body member of the clutching mechanism for securing the outer body member of the clutching mechanism to the outer frame; (III) a frusto-conical inner surface provided on the cylindrical inner surface of the inner body member of the clutching mechanism; and (iv) a concentrically mounted drive shaft having an axially movable frusto-conical member secured thereto, the frusto-conical member being disposed within the aperture in the inner body member of the clutching mechanism; the axially movable member being axially movable between a passive position out of engagement with the frusto-conical inner surface of the inner body member of the clutching mechanism, and an active position in engagement with the frusto-conical inner surface of the inner body member of the clutching mechanism.

These spiral type one-way clutching mechanisms may be embodied as a spiral type one-way clutch assembly including the clutching mechanism as described in the third and the sixth specific embodiments, in combination with: (i) an outer frame; (ii) securing means for securing the outer body member of the clutching mechanism to the outer frame; (iii) a frusto-conical inner surface provided in the cylindrical inner surface of the inner body member of the clutching mechanism; and (iv) a concentrically mounted drive shaft having an axially movable frusto-conical member secured thereto, the frusto-conical member being disposed within the aperture in the inner body member of the clutching mechanism; the axially movable member being axially movable between a passive position out of engagement with the frusto-conical inner surface of the inner body member of the clutching mechanism, and an active position in engagement with the frusto-conical inner surface of the inner body member of the clutching mechanism.

These spiral type one-way clutching mechanisms may be embodied as a spiral type one-way clutch assembly including the clutching mechanism of broad aspects of the invention, in combination with: (i) an inner frame concentrically disposed with respect to the inner body member of the clutching mechanism; (ii) means cooperating with the inner body member of the clutching mechanism for securing the inner frame member to the inner body member of the clutching mechanism; (iii) a frusto-conical surface provided on the outer cylindrical surface of the outer member of the clutching mechanism; and (iv) a concentrically mounted shaft having an axially movable member secured thereto, the member including a dished face enveloping the outer member, and the dished face having a frusto-conical surface thereon; the axially movable member being axially movable between a passive position out of engagement with the frusto-conical outer surface of the outer body member of the clutching mechanism, and an active position in engagement with the frusto-conical outer surface of the outer member of the clutching mechanism.

These spiral type one-way clutching mechanisms may be embodied as a spiral type one-way clutch assembly including the clutching mechanism of the second and fifth specific embodiments, in combination with: (i) an inner frame concentrically disposed with respect to the inner body member of the clutching mechanism; (ii) spline means cooperating with the keyway in the inner body member of the clutching mechanism for securing the inner frame member to the inner body member of the clutching mechanism; (iii) a frusto-conical surface provided on the outer cylindrical surface of the outer body member of the clutching mechanism; and (iv) a concentrically mounted shaft having an axially movable member secured thereto, the member including a dished face enveloping the outer member, and the dished face having a frusto-conical surface thereon; the axially movable member being axially movable between a passive position out of engagement with the frusto-conical outer surface of the outer body member of the clutching mechanism, and an active position in engagement with the frusto-conical outer surface of the outer member of the outer body member of the clutching mechanism.

These spiral type one-way clutching mechanisms may be embodied as a spiral type one-way clutch assembly including the clutching mechanism of the third and sixth specific embodiments, in combination with: (i) an inner frame concentrically disposed with rspect to the inner body member of the clutching mechanism; (ii) securing means for securing the inner frame member to the inner body member of the clutching mechanism; (iii) a frusto-conical surface provided on the outer cylindrical surface of the outer body member of the clutching mechanism; and (iv) a concentrically mounted shaft having an axially movable member secured thereto, the member including a dished face enveloping the outer body member, and the dished face having a frusto-conical surface thereon; the axially movable member being axially movable between a passive position out of engagement with the frusto-conical outer surface of the outer member of the clutching mechanism, and an active position in engagement with the frusto-conical outer surface of the outer member of the clutching mechanism.

(iii) Other Features of the Invention

By another feature of the clutching mechanism of this invention, the limit means comprises a limit spring.

By another feature of the clutching mechanism of this invention, each of the inner and outer spiral surfaces having at least one spiral is constituted by a continuous segment of a spiral extending from a zone of minimum radius to an adjacent zone of maximum radius; the outer body member includes an axially oriented recess in the inner surface thereof adjacent the zone of minimum radius therein; and the limit spring comprises a generally U-shaped spring received in the recess with one leg thereof contacting the inner body member at the zone of maximum radius thereof.

By yet another feature of the clutching mechanism of this invention, the resilient limit means comprises a plurality of axially oriented helical springs, each spring being located in the spiral race and abutting a corresponding pair of facing curved portions of the inner and the outer surfaces of sprial configuration.

BRIEF DESCRIPTION OF THE DRAWINGS

In the accompanying drawings,

FIG. 3 is a cross-section of a spiral type one-way clutching mechanism of yet another embodiment of this invention;

FIG. 4 is a cross-section of a spiral type one-way clutching mechanism of still another embodiment of this invention;

FIG. 5 is a cross-sectional of a spiral type one-way clutching mechanism of yet another embodiment of this invention;

FIG. 6 is a cross-section of a spiral type one-way clutching mechanism of still another embodiment of this invention;

Figure 1:
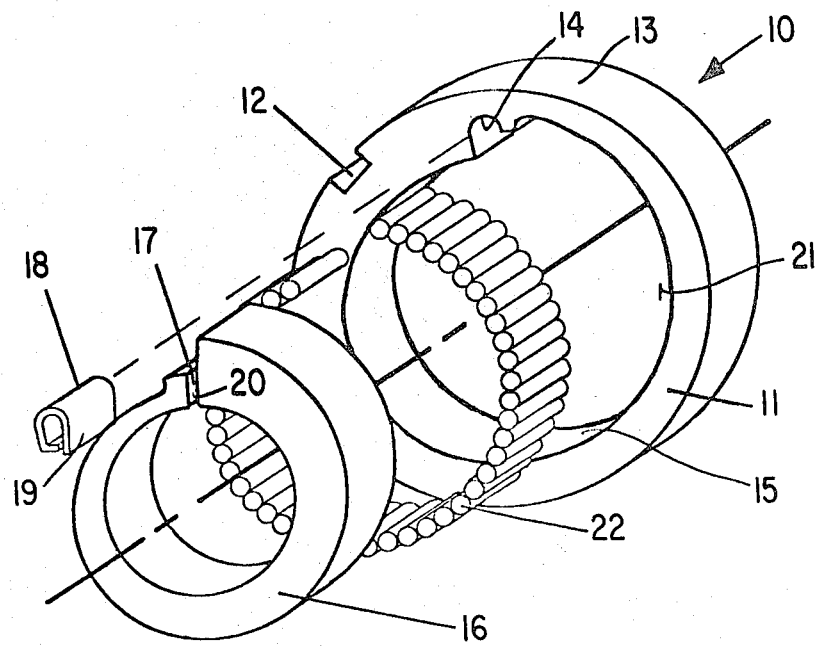
FIG. 1 is an exploded view of a spiral type one-way clutching mechanism of one embodiment of this invention.

DESCRIPTION OF PREFERRED EMBODIMENTS (i) Description of FIG. 1

As seen in FIG. 1, the spiral type one-way clutching mechanism 10 includes a monolithic annular outer body member 11 having a keyway 12 set into its outer cylindrical surface 13, and an indent 14 in its inner spiral surface 15.

Disposed within monolithic annular outer member 11 is an inner member 16 provided with a radial slit 17. A U-shaped limit spring 18 is disposed with one edge 19 against an end 20 of the slit 17, and with its "U" disposed in indent 14. The U-shaped limit spring 18 is only one means acting between the body members to limit relative oscillatory movement therebetween. One alternative way is to provide a very accurate gap between the two body members. Another way is to provide a mass of elastic material, e.g., rubber, between the two body members.

The adjacent surfaces of the outer member 11 and the inner member 16 define a single spiral coil race 21 in which the opposed surfaces are tangentially congruent to each other. A plurality of wedgeable roller members e.g., ball bearings or preferably right cylindrical roller bearings 22 are evenly spaced in, and substantially fill, race 21.

(ii) Description of FIG. 3

The embodiment of FIG. 3 is substantially the same as the embodiment of FIG. 1. Insofar as parts are identical, they will not be described further. The difference resides in the provision of the keyway 12 being disposed in the inner cylindrical surface of inner body member 16, and in that the outer body member 11 is provided with the radial slit 17.

(iii) Description of FIG. 5

The embodiment of FIG. 5 is substantially the same as the embodiments of FIGS. 1 and 3. Insofar as parts are identical, they will not be described further. The difference resides in the omission of the keyway 12 and in the provision of a radial slit 17 in each of the outer body member 11 and the inner body member 16.

Figure 2:
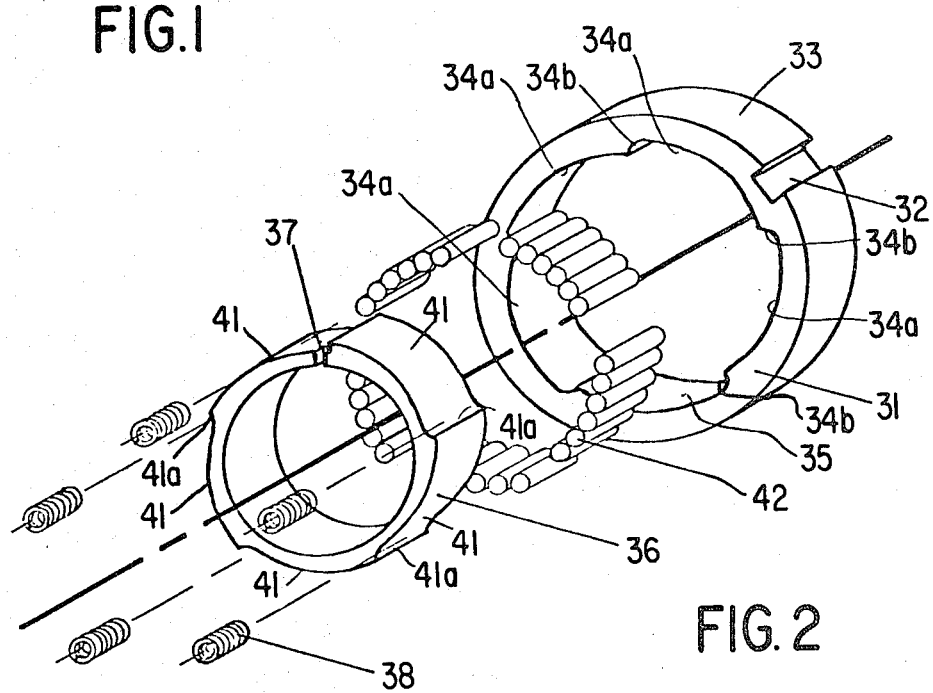
FIG. 2 is an exploded view of a spiral type one-way clutching mechanism of another embodiment of this invention.

(iv) Description of FIG. 2

The embodiment of FIG. 2 includes a monolithic, annular outer member 31 having a keyway 32 set into its outer cylindrical surface 33. The inner surface 35 is provided by a plurality, in this case five, spiral segments 34a, each terminating in an outwardly curved stop portion 34b.

Disposed within outer member 31 is a monolithic, annular inner member 36 provided with a radial slit 37. A plurality of helical limit springs 38 (in this case five) are disposed, one each adjacent a respective outwardly curved stop portion 34b. The helical limit springs 38 are only one means acting between the body members to limit relative oscillatory movement therebetween. Another way is to provide an elastic cylindrical mass, e.g., a rubber cylinder, between the body members adjacent a respective outwardly curved stop portion 34b.

The adjacent surfaces of the outer member 31 and the inner member 36 define a plurality (in this case five) spiral shaped segments 41, each spiral segment ending in an outwardly wound portion 41a. A plurality of wedgeable roller members, e.g., right cylindrical roller bearings 42, are evenly spaced in, and substantially completely fill, the races between spiral segments 34a and spiral shaped segments 41 with limit springs 38 therebetween providing abutments.

(v) Description of FIG. 4

The embodiment of FIG. 4 is substantially the same as the embodiment of FIG. 2. Insofar as parts are identical, they will not be described further. The difference resides in the provision of a keyway 32 in the inner cylindrical surface of the inner member 36, and in that the outer body member 31 is provided with the radial slit 37.

(vi) Description of FIG. 6

The embodiment of FIG. 6 is substantially the same as the embodiment of FIGS. 2 and 4. Insofar as parts are identical, they will not be described further. The difference resides in the omission of the keyway 32, and in the provision of a radial slit 37 in each of the outer body member 31 and the inner body member 36.

Figure 7:
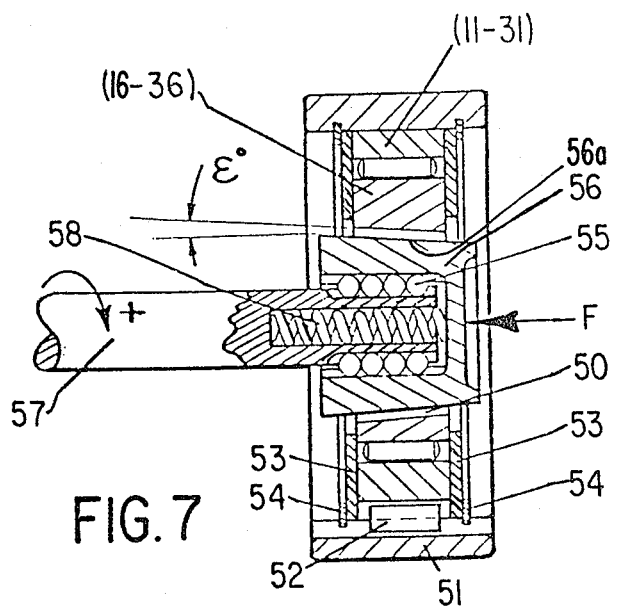
FIG. 7 is a cross-section of a one-way clutch of a still further embodiment of this invention incorporating a spiral type one-way clutching mechanism of this invention.

(vii) Description of FIG. 7

The spiral type one-way clutching mechanism shown in the spiral type one-way clutch assembly of FIG. 7 may be that of FIGS. 1 or 2, or by suitable modification for interconnection, that of FIGS. 5 or 6. In other words, since outer annular member 11 in FIGS. 5 and 6 are radially split, the resiliency of such member will hold it within the clutching mechanism. The inner cylindrical surface of the inner body member 16-36 is modified to provide an inner right conical surface 50. The outer body member 11-36, is keyed to the axially stationary member 51 by key 52. If the clutching mechanism is that of FIGS. 5 or 6, the outer body members 11-31 are free to overrun but can be actuated to engage in the manner as previously described. Two end plates 53 and circlips 54 prevent axial movement of the clutching mechanism. Shaft 57 is provided with an axial ball-spline 55, through which axially movable member 56 having a conical outer surface 56a is attached to the shaft 57. The cone angle $\epsilon$ is a specification of the conical surfaces of both the inner body member and the outer body member of the clutching mechanism. In other words, the cone angle is the angle between the base of the cone and the lateral surface (50 or 56a) of the cone. Spring 58 is a compressive member.

Figure 8:
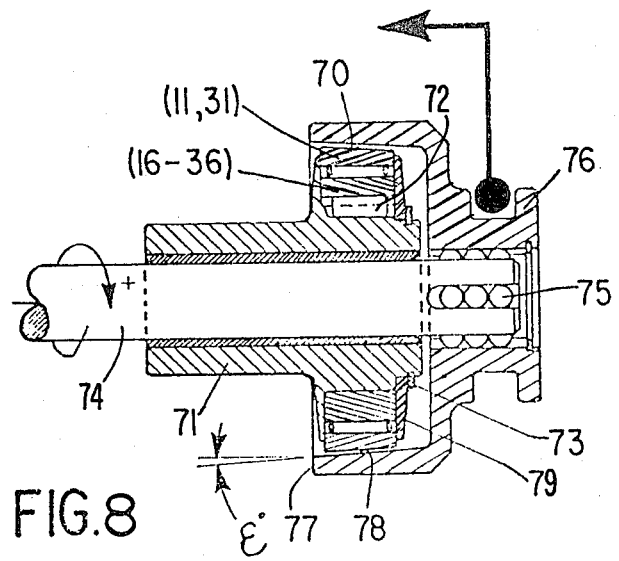
FIG. 8 is a cross-section of a one-way clutch of a still further embodiment of this invention incorporating a spiral type one-way clutch mechanism of this invention.

(viii) Description of FIG. 8

The spiral type one-way clutching mechanism shown in the spiral type one-way clutch assembly of FIG. 8 may be either that of FIGS. 3 or 4, or by suitable modification for interconnection, that of FIGS. 5 or 6. In other words, since outer annular member 11 in FIGS. 5 and 6 are radially split, the resiliency of such member will hold it within the clutching mechanism. The outer cylindrical surface of the outer body member 11-31 is provided with an outer right conical surface 70. The inner body member 16-36 is keyed to the stationary member 71 by the key 72, with the inner body member 16-36 of the clutch of FIGS. 5 and 6, free to overrun on the axially stationary member 71 but which can be actuated to engage in the manner previously described. End plate 79 and circlip 73 prevent axial movement of the clutch assembly. Shaft 74 is provided with an axial ball-spline 75 through which axially movable member 76 is attached. Axially movable member 76 includes a dished face 77 with a conical surface 78 thereon. The cone angle $\epsilon$ is a specification of the conical surfaces of both the inner body member and the outer body member of the clutching mechanism. In other words, the cone angle is the angle between the base of the cone and the lateral surface (70 or 78) of the cone.

OPERATION OF PREFERRED EMBODIMENTS

Figure 9:
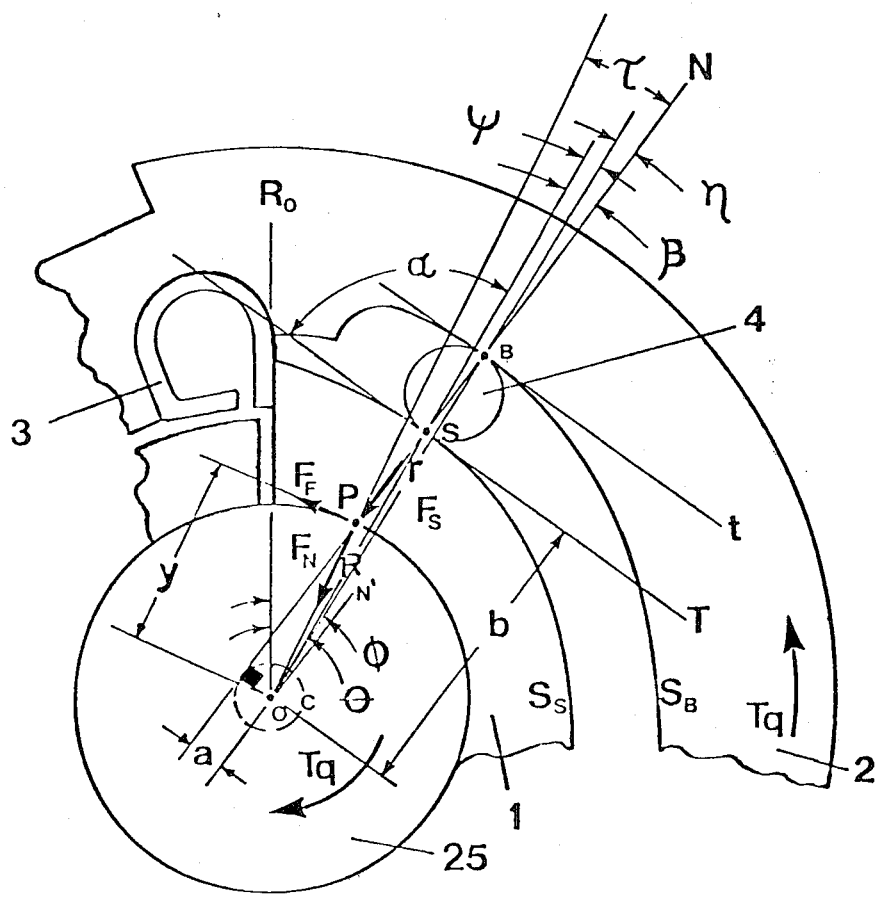
FIG. 9 is a schematic illustration showing the geometry associated with the spirals embodied on the adjacent surfaces of the inner and outer body members of all clutch assemblies.

Before discussing the operation of the preferred embodiments, it is desired to explain the theory of operation with reference to FIG. 9.

FIG. 9 is a partial elevation of the clutch assembly of FIG. 1 showing: the geometry associated with the spirals $S_S$ and $S_B$ respectively embodied on the adjacent surfaces of the slipper 1 and body member 2; their relative relationship to the single roller 4 and to the geometric center 0 of the assembly; and the lines of action of the vector forces $F_f$, $F_n$, and $F_s$ at the point P on the congruous surfaces of the slipper and adaptable shaft 25.

An analysis of the relationship among the vector forces $F_f$ (the frictional force between the slipper and shaft), $F_n$ (the normal force to the congruous surfaces of the slipper and shaft at the point P), and $F_s$ (the strut force through the roller) will show that the angle "$\tau$" must be related to the coefficient of friction "$\mu$" by $$\tan\tau = \mu \quad (1)$$

Since the coefficient of friction $\mu$ is a constant for any given set of conditions that exist between the congruous surfaces of the slipper and shaft, equation (1) specifies the maximum angle between the line of action through any roller member and the normal to the congruous surfaces of the slipper and shaft to prevent slippage.

The condition specified by equation (1) can be met by many different spirals such as the well-known Archimedes, logarithmic, or involute spirals. The choice of spiral is a design option giving clutches of different characteristics. For example if an involute spiral is chosen the strut force ($F_s$) will be constant (neglecting effects from deformation of the clutch parts). If a logarithmic spiral is chosen then the strut angle $\beta$ will be constant.

Whether one of these or some other spiral is chosen the spirals must be parallel, that is, if spiral $S_S$ is defined then the polar coordinates of the spiral $S_B$ are given by $$r = \sqrt{D^2 + R^2 + 2DR\cos\beta} \text{ and} \quad (2)$$

$$\phi = \theta + \tan^{-1}\left(\frac{D\sin\beta}{R - (D\cos\beta)}\right) \text{ or} \quad (3)$$

$$\phi = \theta + \psi \quad (4)$$

where D is the roller diameter.

The relationship between $\beta$, $\eta$, and $\psi$ can be shown by drawing the line $N^1$ parallel to the perpendicular N, through the ordinate O.

$$\eta = \beta - \psi \quad (5)$$

In the terminology of the state-of-the-art one-way clutches, the angles $\beta$ and $\eta$ may be likened to the "strut-angle" associated with the individual sprag and roller jamming-elements. Accordingly, the break-out force of the disclosed clutch assemblies, will be dependent on the value of these angles. Although either angle $\beta$ or $\eta$ may be kept constant by proper definition of the given spiral $S_s$, both cannot be constant, nor will the strut-forces in the roller members be the same.

While the specified spiral $S_s$ and parallel spiral $S_B$ may be interchanged in FIG. 9, or the spirals as shown generated independently in relationship to some other defined spiral, their relative relationship as described in equations (2) to (5) will remain unaltered, with the requirement as specified in equation (1) being mandatory on at least one of the roller members to prevent slippage. Once the configuration of the spiral surfaces are defined, the relative strut-forces across the roller members are fixed, and the role of chance is prevented from playing any part in the distribution of strut-forces in the roller members.

Transverse forces through the clutch assemblies have no effect on this locking action, and overrunning frictional wear is not felt on either of the critically shaped spiral surfaces, or the roller members.

(ii) Description of Operation of FIGS. 1 and 2

The clutch assemblies shown in FIGS. 1 and 2 are adaptable to a cylindrical shaft (not shown) having a conjugate interference fit with the inner cylindrical surface of their respective inner body members 16 and 36. When relative counterclockwise rotation of the respective outer body members 11 and 31 takes place, the combination of the rollers 22, 42 and the embodied adjacent spiral surfaces of the inner body members 16, 36 and outer body members 11, 31 force the inner body members 16, 36 to contract radially against the shaft augmenting the small frictional resistance caused by the interference fit, thus restricting anticlockwise rotation to that required to effect clutching. During relative clockwise rotation of the outer body members 11, 31, the frictional resistance between the inner body members 16, 36 and the shaft is limited to that which is caused by the interference fit, which is insufficient to prevent overrunning of the clutch body. Their respective limit spring(s) 18 and 38 limit the relative oscillatory rotation of the inner body members 16, 36 during high overrunning speeds, and assist in maintaining the interference fit between the inner body members 16, 36 and the cylindrical shaft.

(iii) Description of Operation of FIGS. 3 and 4

The clutch assemblies shown in FIGS. 3 and 4 are adaptable to a hollow shaft (not shown) having a conjugate interference fit with the cylindrical surface of their respective outer body members 11 and 31. When a relative clockwise rotation of their respective inner body members 16 and 36 takes place, the combination of the rollers 14 and the embodied adjacent spiral surfaces of the outer body members 11, 31 and inner body members 16, 36 force the outer body members 11, 31 to expand radially against the shaft augmenting the small frictional resistance caused by the interference fit, thus restricting clockwise rotation to that required to effect clutching. During relative counterclockwise rotation of the outer body members 11, 31 and inner body members 16, 36, the frictional resistance between the outer body members 11, 31 and the shaft is limited to that which is caused by the interference fit, which again is insufficient to prevent overrunning of the clutch body. Again, their limit springs 18 and 38 respectively 17 and 38 perform the same tasks as stated in the operation of FIGS. 1 and 2.

(iv) Description of Operation of FIGS. 5 and 6

The clutch assemblies shown in FIGS. 5 and 6 are adaptable to the two concentric, cylindrical clutching members of any clutch installation. Clutching and overrunning action of the slipper members are as defined in the discussion of the clutches of FIGS. 1 and 2, 3 and 4.

(v) Description of Operation and FIG. 7

With the spiral type one-way clutch assembly as shown in FIG. 7, force F has compressed spring 58 so that the mating conical members are disengaged. Accordingly, the clutch assembly is in the passive mode, and shaft 57 is free to rotate in either direction. As force F decreases, member 56 moves to the active mode. Clockwise rotation (+) of shaft 57 will again be restricted to that required to effect clutching, as previously described in the discussion of the clutch assemblies of FIGS. 1 and 2. Anticlockwise overrunning of shaft 57 as described above can only be assured by limiting the axial movement of the movable member 56 so that the force on the engaged cones is restricted to that necessary to achieve the same desired interference fit, i.e., the spring force less force F. Effectively, the limit spring(s) must remain open during active-mode operation, except during excessive overrunning speed as hereinbefore discussed. The required value of the specified cone angle $\epsilon$ to ensure that movable member 56 will not move towards the passive mode position when the inner body member 16, 36 radially contracts, has the normal relationship to the coefficient of friction $\mu$ between the conical surfaces of the respective members as with any cone clutching device, i.e., tan $\Sigma < \mu$. The clutch assembly shown in FIG. 7 does not include the members required to activate and limit the movement of member 56, since it is only the embodiment of a right conical surface on the respective inner members 16 and 36 the clutching mechanism shown in FIGS. 1, 2, 5 and 6, that is an embodiment of the invention.

(vi) Description of the Operation of FIG. 8

With the spiral type one-way clutch assembly as shown in FIG. 8, the respective conical surfaces 70 of the outer body member and 78 of the axially movable member 76 are disengaged. The clutch assembly is in the passive mode and shaft 74 is free to rotate in either direction. When movable member 76 is moved axially in the direction of the arrow, conical surfaces 70 and 78 become engaged and the clutch assembly is in the active mode with anticlockwise rotation (−) of shaft 74 restricted, and clockwise rotation (+) unrestricted, as previously described in the discussion of the clutching assemblies of FIGS. 3 and 4. Again, axial movement of member 76 must be limited so that limit spring(s) remain open during active mode operation as described in the discussion of FIG. 7.

SUMMARY

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and "intended" to be, within the full range of equivalence of the following claims.

I claim:

1. A spiral type one-way clutching mechanism comprising:
   (a) a monolithic, annular outer body member including an inner spiral surface having at least one spiral segment defining an axially oriented opening through the outer body member;
   (b) a concentrically mounted, monolithic inner body member positioned in said axially oriented opening, including an outer spiral surface having at least one spiral segment which is tangentially congruent to the inner spiral surface of said outer body member, said congruent inner and outer spiral surfaces defining a spiral race therebetween, one end of said spiral race defined in part by said outer spiral surface having an inner abutment provided by a radially outwardly extending protrusion or flange on said inner body member, the other end of said spiral race defined in part by said inner spiral surface having an outer abutment provided by a radially inwardly directed protrusion on said outer body member, at least one of said body members having a radially directed slit extending therethrough; said outer body member (a) and said inner body member (b) being relatively rotatably oscillatable with respect to each other;
   (c) a plurality of axially oriented roller members positioned in said spiral race, substantially but not completely filling said spiral race, said roller members contacting said inner and said outer spiral surfaces and adapted to abut said inner abutment and said outer abutment when free-wheeling; and
   (d) resilient limit means acting between said body members, for limiting relative oscillatory movement therebetween.

2. The spiral type one-way clutching mechanism of claim 1 wherein said means (d) comprises a limit spring.

3. A spiral type one-way clutch assembly comprising the spiral type one-way clutching mechanism of claim 1 in combination with:
   (i) an axially stationary outer frame;
   (ii) means cooperating with said outer body member of said clutching mechanism for securing said outer body member of said clutching mechanism to said outer frame;
   (iii) said inner body member of said clutching mechanism having a frusto-conical inner surface; and
   (iv) a concentrically mounted drive shaft having an axially movable frusto-conical member secured thereto, said frusto-conical member being disposed within said aperture in said inner body member of said clutching mechanism;
   said axially movable member being axially movable between a passive position out of engagement with said frusto-conical inner surface of said inner body member of said clutching mechanism, and an active position in engagement with said frusto-conical inner surface of said inner body member of said clutching mechanism.

4. A spiral type one-way clutch assembly comprising the spiral type one-way clutching mechanism of claim 1 in combination with:
   (i) an axially stationary inner frame concentrically disposed with respect to said inner body member of said clutching mechanism;
   (ii) means cooperating with said inner body member of said clutching mechanism for securing said inner frame member to said inner body member of said clutching mechanism;
   (iii) said outer body member of said clutching mechanism having a frusto-conical outer surface; and
   (iv) a concentrically mounted shaft having an axially movable member secured thereto, said member including a dished face enveloping said outer body member, and said dished face having a frusto-conical surface thereon;
   said axially movable member being axially movable between a passive position out of engagement with said frusto-conical outer surface of said outer body member of said clutching mechanism, and an active position in engagement with said frusto-conical outer surface of said outer body member of said clutching mechanism.

5. A spiral type one-way clutching mechanism comprising:
   (a) a monolithic, annular outer body member having a cylindrical outer surface provided with a keyway therein and an inner spiral surface having at least one spiral segment defining an axially oriented opening through the outer body member;
   (b) a concentrically mounted, monolithic, annular inner body member positioned in said axially oriented opening having a cylindrical inner surface and an outer spiral surface having at least one spiral segment which is tangentially congruent to the inner spiral surface of said outer body member, said congruent inner and outer spiral surfaces defining a spiral race therebetween, one end of said spiral race defined in part by said outer spiral surface having an inner abutment provided by a radially outwardly extending protrusion or flange on said inner body member, the other end of said spiral race defined in part by said inner spiral surface having an outer abutment provided by a radially inwardly directed protrusion on said outer body member; said outer body member (a) and said inner body member (b) being relatively rotatably oscillatable with respect to each other;

(c) a plurality of axially oriented, abutting roller members positioned in said spiral race, substantially but not completely filling said spiral race, said roller members contacting said inner and said outer spiral surfaces and adapted to abut said inner abutment and said outer abutment when free-wheeling; and (d) limit spring means acting between said body members for limiting relative oscillatory movement therebetween.

6. A spiral type one-way clutching mechanism according to claim 5 wherein each of said inner and outer spiral surfaces having at least one spiral segment is constituted by a continuous segment of a spiral extending from a zone of minimum radius to an adjacent zone of maximum radius; wherein said outer body member includes an axially oriented recess in the inner surface thereof adjacent the zone of minimum radius therein; and wherein said limit spring means comprises a generally U-shaped spring received in said recess with one leg thereof contacting said inner body member at the zone of maximum radius thereof.

7. A spiral type-one-way clutch assembly comprising the spiral type one-way clutching mechanism of claim 5 in combination with:
  (i) an axially stationary outer frame;
  (ii) spline means cooperating with said keyway in said outer member of said clutching mechanism for securing said outer body member of said clutching mechanism to said outer frame;
  (iii) said inner body member of said clutching mechanism having a frusto-conical inner surface; and
  (iv) a concentrically mounted drive shaft having an axially movable frusto-conical member secured thereto, said frusto-conical member being disposed within said aperture in said inner body member of said clutching mechanism;

said axially movable member being axially movable between a passive position out of engagement with said frusto-conical inner surface of said inner body member of said clutching mechanism, and an active position in engagement with said frusto-conical inner surface of said inner body member of said clutching mechanism.

8. A spiral type one-way clutching mechanism comprising:
  (a) a monolithic, annular, outer body member having a cylindrical outer surface, and an inner spiral surface having at least one spiral segment defining an axially oriented opening through the outer body member, said outer body member having a radially directed slit extending therethrough;

(b) a concentrically mounted, monolithic, annular inner body member positioned in said axially oriented opening, having a cylindrical inner surface provided with a keyway therein, and an outer spiral surface having at least one spiral segment which is tangentially congruent to the inner spiral surface of said outer body member, said congruent inner and outer spiral surfaces defining a spiral race therebetween, one end of said spiral race defined in part by said outer spiral surface having an inner abutment provided by a radially outwardly extending protrusion or flange on said inner body member, the other end of said spiral race defined in part by said inner spiral surface having an outer abutment provided by a radially inwardly directed protrusion on said outer body member; said outer body member (a) and said inner body member (b) being relatively rotatably oscillatable with respect to each other;

(c) a plurality of axially oriented, abutting roller members positioned in said spiral race, substantially but not completely filling said spiral race, said roller members contacting said inner and said outer spiral surfaces and adapted to abut said inner abutment and said outer abutment when free-wheeling; and (d) limit spring means acting between said body members for limiting relative oscillatory movement therebetween.

9. A spiral type one-way clutch mechanism according to claim 8 wherein each of said inner and outer spiral surfaces having at least one spiral segment is constituted by a continuous segment of a spiral extending from a zone of minimum radius to an adjacent zone of maximum radius; wherein said outer body member includes an axially oriented recess in the inner surface thereof adjacent the zone of minimum radius therein; and wherein said limit spring means comprises a generally U-shaped spring received in said recess with one leg thereof contacting said inner body member at the zone of maximum radius thereof.

10. A spiral type one-way clutch assembly comprising the spiral type one-way clutching mechanism of claim 8 in combination with:
  (i) an axially stationary inner frame concentrically disposed with respect to said inner body member of said clutching mechanism;
  (ii) spline means cooperating with said keyway of said inner body member of said clutching mechanism for securing said inner frame member to said inner body member of said clutching mechanism;
  (iii) said outer body member of said clutching mechanism having a frusto-conical outer surface; and
  (iv) a concentrically mounted shaft having an axial movable member secured thereto, said member including a dished face enveloping said outer body member, and said dished face having a frusto-conical surface thereon;

said axially movable member being axially movable between a passive position out of engagement with said frusto-conical outer surface of said outer body member of said clutching mechanism, and an active position in engagement with said frusto-conical outer surface of said outer body member of said clutching mechanism.

11. A spiral type one-way clutching mechanism comprising:
  (a) a monolithic, annular, outer body member having a cylindrical outer surface and an inner spiral surface having at least one spiral segment defining an axially oriented opening through the outer body member, said outer member having a radially directed slit extending therethrough;

(b) a concentrically mounted, monolithic, annular inner body member positioned in said axially oriented opening, having a cylindrical inner surface, and an outer spiral surface having at least one spiral segment which is tangentially congruent to the inner spiral surface of said outer body member, said congruent inner and outer spiral surfaces defining a spiral race therebetween, one end of said spiral race defined in part by said outer spiral surface having an inner abutment provided by a radially outwardly extending protrusion or flange on said inner body member, the other end of said spiral race defined in part by said inner spiral surface having an outer abutment provided by a radially inwardly directed protrusion on said outer body member, said inner member having a radially directed slit extending therethrough; said outer body member (a) and said inner body member (b) being relatively rotatably oscillatable with respect to each other;

(c) a plurality of axially oriented, abutting roller members positioned in said spiral race, substantially but not completely filling said spiral race, said roller members contacting said inner and said outer spiral surfaces and adapted to abut said inner abutment and said outer abutment when free-wheeling; and (d) limit spring means acting between said body members for limiting relative oscillatory movement therebetween.

12. A spiral type one-way clutching mechanism according to claim 11 wherein each of said inner and outer spiral surfaces having at least one spiral segment is constituted by a continuous segment of a spiral extending from a zone of minimum radius to an adjacent zone of maximum radius; wherein said outer body member includes an axially oriented recess in the inner surface thereof adjacent the zone of minimum radius therein; and wherein said limit spring means comprises a generally U-shaped spring received in said recess with one leg thereof contacting said inner body member at the zone of maximum radius thereof.

13. A spiral type one-way clutch assembly comprising the spiral type one-way clutching mechanism of claim 11 in combination with:

(i) an axially stationary outer frame;
(ii) securing means for securing said outer body member of said clutching mechanism to said outer frame;
(iii) said inner body member of said clutching mechanism having a frusto-conical inner surface; and
(iv) a concentrically mounted drive shaft having an axially movable frusto-conical member secured thereto, said frusto-conical member being disposed within said aperture in said body member of said clutching mechanism;

said axially movable member being axially movable between a passive position out of engagement with said frusto-conical inner surface of said inner body member of said clutching mechanism, and an active position in engagement with said frusto-conical inner surface of said inner body member of said clutching mechanism.

14. A spiral type one-way clutch assembly comprising the spiral type one-way clutching mechanism of claim 11 in combination with:

(i) an axially stationary inner frame concentrically disposed with respect to said inner body member of said clutching mechanism;
(ii) securing means for securing said inner frame member to said inner body member of said clutching mechanism;
(iii) said outer member of said clutching mechanism having a frusto-conical outer surface; and
(iv) a concentrically mounted shaft having an axially movable member secured thereto, said member including a dished face enveloping said outer body member, and said dished face having a frusto-conical surface thereon;

said axially movable member being axially movable between a passive position out of engagement with said frusto-conical outer surface of said outer body member of said clutching mechanism, and an active position in engagement with said frusto-conical outer surface of said outer body member of said clutching mechanism.

15. A spiral-type, one-way clutching mechanism comprising:

(a) a monolithic, annular, outer body member having a cylindrical outer surface provided with a keyway therein and an inner spiral surface having at least one spiral segment defining an axially oriented opening through the outer body member;

(b) a concentrically mounted, monolithic, annular inner body member positioned in said axially oriented opening having a cylindrical inner surface and an outer spiral surface having at least one spiral segment which is tangentially congruent to the inner spiral surface of said outer body member, said congruent inner and outer spiral surfaces defining a spiral race therebetween, one end of said spiral race defined in part by said outer spiral surface having inner abutments provided by a plurality of radially outwardly curved wound portions on said inner body, each such portion cooperating with an adjacent helical limit spring, the other end of said spiral race being defined in part by said inner spiral surface having outer abutments provided by a plurality of radially inwardly directed stop portions on said outer body member, each such portion cooperating with a respective adjacent helical limit spring, said inner member having a radially directed slit extending therethrough, each of said inner and outer surfaces of spiral configuration being constituted by a plurality of circumferentially adjacent spiral segments, each segment extending from a zone of maximum radius to a zone of minimum radius, each zone of minimum radius being connected to an adjacent zone of maximum radius by a radially outwardly curved portion of the inner and outer spiral surfaces respectively; said outer body member (a) and said inner body member (b) being relatively rotatably oscillatable with respect to each other;

(c) a plurality of axially oriented, abutting roller members positioned in said spiral race, substantially but not completely filling said spiral race, said roller members contacting said inner and said outer spiral surfaces and adapted to abut said inner abutments and said outer abutments when free-wheeling; and (d) resilient limit means acting between said body members for limiting relative-oscillatory movement therebetween.

16. A spiral type one-way clutching mechanism according to claim 15 wherein said resilient limit means comprises said plurality of helical limit springs.

17. A spiral type one-way clutch assembly comprising the spiral type one-way clutching mechanism of claim 15 in combination with:
   (i) an axially stationary outer frame;
   (ii) spline means cooperating with said keyway in said outer member of said clutching mechanism for securing said outer body member of said clutching mechanism to said outer frame;
   (iii) said inner body member of said clutching mechanism having a frusto-conical inner surface; and
   (iv) a concentrically mounted drive shaft having an axially movable frusto-conical member secured thereto, said frusto-conical member being disposed within said aperture in said inner body member of said clutching mechanism;
said axially movable member being axially movable between a passive position out of engagement with said frusto-conical inner surface of said inner body member of said clutching mechanism, and an active position in engagement with said frusto-conical inner surface of said inner body member of said clutching mechanism.

18. A spiral type one-way clutching mechanism comprising:
   (a) a monolithic, annular, outer body member having a cylindrical outer surface, and an inner spiral surface having at least one spiral segment defining an axially oriented opening through the outer body member, said outer body member having a radially directed slit extending therethrough;
   (b) a concentrically mounted, monolithic, annular inner body member position in said axially oriented opening, having a cylindrical inner surface provided with a keyway therein, and an outer spiral surface having at least one spiral segment which is tangentially congruent to the inner spiral surface of said outer body member, said congruent inner and outer spiral surfaces defining a spiral race therebetween, one end of said spiral race defined in part by said outer spiral surface having inner abutments, provided by a plurality of radially outwardly curved wound portions on said inner body, each such portion cooperating with an adjacent helical limit spring, the other end of said spiral race being defined in part by said inner spiral surface having outer abutments provided by a plurality of radially inwardly directed stop portions on said outer body member, each such portion cooperating with a respective adjacent helical limit spring, each of the inner and outer surfaces of spiral configuration being constituted by a plurality of circumferentially adjacent spiral segments, each segment extending from a zone of maximum radius to a zone of minimum radius, each zone of minimum radius being connected to an adjacent zone of maximum radius by a radially outwardly curved portion of the inner and outer spiral surfaces respectively; said outer body member (a) and said inner body member (b) being relatively rotatably oscillatable with respect to each other;
   (c) a plurality of axially oriented, abutting roller members positioned in said spiral race, substantially but not completely filling said spiral race, said roller members contacting said inner and said outer spiral surfaces and adapted to abut said inner abutments and said outer abutments when free-wheeling; and
   (d) resilient limit means acting between said body members for limiting relitive oscillatory movement therebetween.

19. A spiral type one-way clutching mechanism according to claim 18 wherein said resilient limit means comprises said plurality of helical limit springs.

20. A spiral type one-way clutch assembly comprising the spiral type one-way clutching mechanism of claim 18 in combination with:
   (i) an axially stationary inner frame concentrically disposed with respect to said inner body member of said clutching mechanism;
   (ii) spline means cooperating with said keyway of said inner body member of said clutching mechanism for securing said inner frame member to said inner body member of said clutching mechanism;
   (iii) said outer body member of said clutching mechanism having a frusto-conical outer surface; and
   (iv) a concentrically mounted shaft having an axially movable member secured thereto, said member including a dished face enveloping said outer body member, and said dished face having a frusto-conical surface thereon;
said axially movable member being axially movable between a passive position out of engagement with said frusto-conical outer surface of said outer body member of said clutching mechanism, and an active position in engagement with said frusto-conical outer surface of said outer body member of said clutching mechanism.

21. A spiral type one-way clutching mechanism comprising:
   (a) a monolithic, annular, outer body member having a cylindrical outer surface and an inner spiral surface having at least one spiral segment defining an axially oriented opening through the outer body member, said outer member having a radially directed slit extending therethrough;
   (b) a concentrically mounted, monolithic, annular inner body member positioned in said axially oriented opening, having a cylindrical inner surface and an outer spiral surface having at least one spiral segment which is tangentially congruent to the inner spiral surface of said outer body member, said congruent inner and outer spiral surface defining a spiral race therebetween, one end of said spiral race defined in part by said outer spiral surface having inner abutments provided by a plurality of radially outwardly curved wound portions on said inner body, each such portion cooperating with an adjacent helical limit spring, the other end of said spiral race being defined in part by said inner spiral surface having outer abutments provided by a plurality of radially inwardly directed stop portions on said outer body member, each such portion cooperating with a respective adjacent helical limit spring, each of said inner and outer surfaces of spiral configuration being constituted by a plurality of circumferentially adjacent spiral segments, each segment extending from a zone of minimum radius, each zone of minimum radius being connected to an adjacent zone of maximum radius by a radially outwardly curved portion of the inner and outer spiral surfaces respectively, said inner member having a radially directed slit extending therethrough; said outer body member (a) and said inner body member (b) being relatively rotatably oscillatable with respect to each other;

(c) a plurality of axially oriented, abutting roller members positioned in said spiral race, substantially but not completely filling said spiral race, said roller members contacting said inner and said outer spiral surfaces and adapted to abut said inner abutments and said outer abutments when free-wheeling; and (d) resilient limit means acting between said body members for limiting relative oscillatory movement therebetween.

22. A spiral type one-way clutching mechanism according to claim 21 wherein said resilient limit means comprises said plurality of helical limit springs.

23. A spiral type one-way clutch assembly comprising the spiral type one-way clutching mechanism of claim 21 in combination with:

(i) an axially stationary outer frame;
(ii) securing means for securing said outer body member of said clutching mechanism to said outer frame;
(iii) said inner body member of said clutching mechanism having a frusto-conical inner surface; and
(iv) a concentrically mounted drive shaft having an axially movable frusto-conical member secured thereto, said frusto-conical member being disposed with said aperture in said inner body member of said clutching mechanism;

said axially movable member being axially movable between a passive position out of engagement with said frusto-conical inner surface of said inner body member of said clutching mechanism, and an active position in engagement with said frusto-conical inner surface of said inner body member of said clutching mechanism.

24. A spiral type one-way clutch assembly comprising the spiral type one-way clutching mechanism of claim 21 in combination with:

(i) an axially stationary inner frame concentrically disposed with respect to said inner body member of said clutching mechanism;
(ii) securing means for securing said inner frame member to said inner body member of said clutching mechanism;
(iii) said outer member of said clutching mechanism having a frusto-conical outer surface: and
(iv) a concentrically mounted shaft having an axially movable member secured thereto, said member including a dished face enveloping said outer body member, and said dished face having a frusto-conical surface thereon;

said axially movable member being axially movable between a passive position out of engagement with said frusto-conical outer surface of said outer body member of said clutching mechanism, and an active position in engagement with said frusto-conical outer surface of said outer body member of said clutching mechanism.

* * * * *